(12) United States Patent
Aimoto

(10) Patent No.: US 7,248,533 B2
(45) Date of Patent: Jul. 24, 2007

(54) SEMICONDUCTOR CIRCUIT APPARATUS WITH POWER SAVE MODE

(75) Inventor: Yoshiharu Aimoto, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/088,750

(22) Filed: Mar. 25, 2005

(65) Prior Publication Data

US 2005/0213416 A1 Sep. 29, 2005

(30) Foreign Application Priority Data

Mar. 29, 2004 (JP) .............................. 2004-094499

(51) Int. Cl.
*G11C 5/14* (2006.01)

(52) U.S. Cl. .................. 365/227; 365/189.11; 365/229

(58) Field of Classification Search ................. 365/229
See application file for complete search history.

(56) References Cited

U.S. PATENT DOCUMENTS

| | | | | |
|---|---|---|---|---|
| 3,859,638 A | * | 1/1975 | Hume, Jr. .................... | 365/229 |
| 4,616,346 A | * | 10/1986 | Nakaizumi et al. .......... | 365/229 |
| 4,631,707 A | * | 12/1986 | Watanabe .................... | 365/226 |
| 4,827,149 A | * | 5/1989 | Yabe ............................ | 307/64 |
| 4,937,789 A | * | 6/1990 | Matsubara .................. | 365/226 |
| 5,058,075 A | * | 10/1991 | Mizuta ......................... | 365/229 |
| 5,300,824 A | * | 4/1994 | Iyengar ........................ | 327/540 |
| 5,307,318 A | * | 4/1994 | Nemoto ....................... | 365/226 |
| 5,341,340 A | * | 8/1994 | Hagura ........................ | 365/226 |
| 5,901,103 A | * | 5/1999 | Harris et al. ................. | 365/226 |
| 6,166,960 A | * | 12/2000 | Marneweck et al. ... | 365/185.28 |
| 6,288,963 B1 | * | 9/2001 | Kato ............................ | 365/222 |
| 6,301,184 B1 | * | 10/2001 | Sasaki et al. ............... | 365/226 |
| 6,373,755 B1 | * | 4/2002 | Manning ................ | 365/189.09 |
| 6,657,911 B2 | * | 12/2003 | Yamaoka et al. ........... | 365/226 |
| 6,693,840 B2 | * | 2/2004 | Shimada et al. ............ | 365/228 |
| 6,791,894 B2 | * | 9/2004 | Nagai et al. ................. | 365/226 |
| 6,795,366 B2 | * | 9/2004 | Lee .............................. | 365/226 |
| 6,982,915 B2 | * | 1/2006 | Houston et al. ............. | 365/211 |
| 7,031,220 B2 | * | 4/2006 | Watanabe et al. ........... | 365/226 |

FOREIGN PATENT DOCUMENTS

| JP | 2001-156260 A | 6/2001 |
|---|---|---|
| JP | 2003-188351 A | 7/2003 |

* cited by examiner

*Primary Examiner*—Tan T. Nguyen
(74) *Attorney, Agent, or Firm*—Sughrue Mion, PLLC

(57) ABSTRACT

A semiconductor circuit apparatus comprises a substrate and a circuit block including a memory formed on the substrate. The circuit block performs regular operations at a first power supply voltage in an active mode, and a part of the circuit block is stopped and the memory keeps stored data at a second power supply voltage smaller than the first power supply voltage in a power save mode. The memory holds the stored data during the power save mode, resulting in higher speed return to a regular active mode, as well as power consumption reduction.

16 Claims, 11 Drawing Sheets

SEMICONDUCTOR CIRCUIT APPARATUS WITH POWER SAVE MODE

BACKGROUND OF THE INVENTION

1. Field of the Invention

The invention relates to a semiconductor circuit apparatus, more particularly, a semiconductor circuit apparatus having a power save mode and an active mode.

2. Description of Related Art

Semiconductor technological advances and more multifaceted and sophisticated products have given rise to demand for faster, more sophisticated, larger scale and less power consumption semiconductor circuits. In order to meet such demand, semiconductor chips with system on chip structure, in which multiple circuit blocks of different functions are formed, are widely used. Further, semiconductor circuit chips which have multiple operation modes are proposed to reduce the power consumption. Such electrical products have a standby mode, which is a power save mode, in which a part of the circuit is deactivated so that the standby power consumption is reduced.

One typical example of electric device with the standby mode is a handheld mobile device, such as a cellular phone and PDA (Personal Digital Assistance). Since the mobile devices use a battery as a power supply and there is a demand for long continuous use, the reduction of power consumption of semiconductor circuit chips is highly demanded. Furthermore, as more sophisticated cellular phones are introduced, more sophisticated and higher operation speed semiconductor circuit chips are significantly required.

Though a cellular phone needs to operate constantly in preparation for incoming calls, not all the circuit needs to operate constantly. Power consumption reduction is accomplished by activating only the necessary circuits during the standby period. An increase of the drive voltage results in higher speed circuit, but an increase in the drive voltage can lead to increased power consumption. Therefore, a technique is proposed which reduces the drive voltage and the thickness of gate insulating film of a device to accomplish reduced power consumption, as well as achieving high speed operation with increased on-current.

FIG. 10 is a schematic block diagram of a related semiconductor circuit apparatus having multiple circuit blocks and a standby mode as an operation mode. A semiconductor circuit apparatus comprises the first circuit block 1001, the second circuit block 1002 and I/O circuit part 1003. The first and second circuit blocks 1001, 1002 have a processor, a memory, an analog circuit portion part and a digital circuit part, respectively. Each of circuit blocks 1001-1003 has an interface control circuit.

FIG. 11 shows the power supply voltage levels in an active mode and a standby mode. Vdd1, Vdd2 and Vdd3 correspond to the voltage levels of the first circuit block 1001, the second circuit block 1002 and I/O circuit part 1003, respectively. When entering the standby mode from the regular active mode, power supply to the second circuit block 1002 is stopped and only the first circuit block 1001 and I/O circuit part 1003 operate. The first circuit block 1001 contains a circuit which controls switching to the active mode and a memory for storing data necessary to return to the active mode.

In the above semiconductor circuit apparatus, the thicknesses of gate insulating films of respective circuit blocks may be set to different values. Specifically, it follows: I/O circuit part 1003>first circuit block 1001>second circuit block 1002. Thinner gate insulating films of the second circuit block 1002 which operates in the active mode allow high speed operation of the circuit block. Furthermore, thicker gate insulating films of the first circuit block 1001 and I/O circuit part 1003 which operate in the standby mode afford a reduction in leak current and reduction in power consumption in the standby mode. A semiconductor circuit apparatus configured as above is disclosed in Japanese Published Unexamined Patent Application No. 2003-188351. Besides, Japanese Published Unexamined Patent Application No. 2001-156260, for example, discloses a technique varying the gate insulating film thickness from circuit block to circuit block.

The above mentioned circuit configuration can reduce the power consumption by using the standby mode. It has now been discovered that in the transition to the standby mode in the above semiconductor circuit apparatus, it is needed to fix input signals from the second circuit block 1002 to other circuit blocks, and also needed to clamp to ground or separate output signals from other circuit blocks to the second circuit block 1002 in order to stop the power supply to the second circuit block 1002. Thus, the sequence to stop power supply to the second circuit block 1002 is necessary, as well as an interface control circuit.

Also, a regular power-on sequence is needed to return from the standby mode to the active mode and resume the power supply to the second circuit block since each node level is undefined. The circuit configuration and sequence for mode switching is thus complicated, and it takes long time to go into the active mode from the standby mode. And, the leak current control by changing only the thickness of a gate oxide film can not meet the requirements of both the operation performance during the active mode and leak current reduction during the standby mode.

SUMMARY OF THE INVENTION

According to an aspect of the invention, there is provided a semiconductor circuit apparatus comprising a circuit block including a memory, a power supply control circuit providing a reduced power supply voltage to the circuit block in a power save mode at which a part of the circuit block is stopped and the memory is capable of keeping stored data.

According to an aspect of the invention, there is provided a semiconductor circuit apparatus comprising a substrate and a circuit block including a memory formed on the substrate. The circuit block performs regular operations at a first power supply voltage in an active mode, and a part of the circuit block is stopped and the memory keeps stored data at a second power supply voltage smaller than the first power supply voltage in a power save mode.

The memory holds the stored data during the power save mode, resulting in higher speed return to a regular active mode, as well as power consumption reduction.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Embodiment 1

Figure 1:
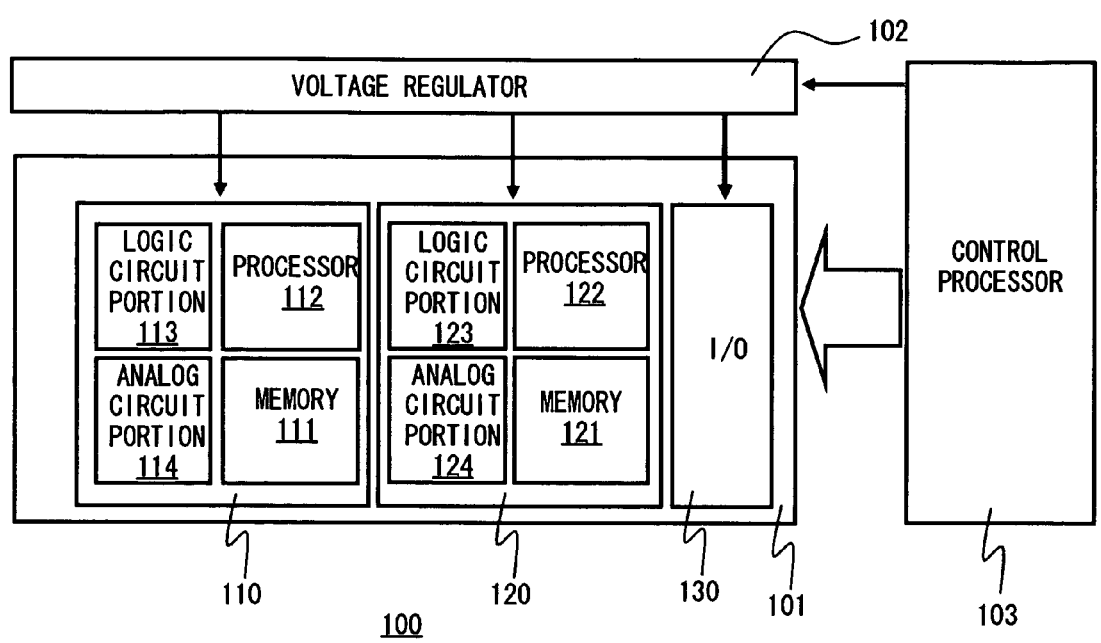
FIG. 1 is a schematic block diagram of a semiconductor circuit apparatus according to Embodiment 1.

FIG. 1 is a schematic diagram illustrating a semiconductor circuit apparatus 100 according to this embodiment. Referring to FIG. 1, a voltage regulator 102 provides a semiconductor circuit chip 101 with power supply voltages, including a higher voltage Vdd and lower voltage Vss. A control processor 103 controls the semiconductor circuit chip 101 and the voltage regulator 102. In this embodiment, the voltage regulator 102 and control processor 103 are formed outside of the semiconductor circuit chip 101, namely formed in a different chip than the semiconductor circuit chip 101.

The semiconductor circuit chip 101 comprises a first circuit block 110, second circuit block 120, and I/O circuit 130 which is a interface circuit performs date input/output with external circuits. The first and the second circuit blocks communicate data with external circuits through the I/O circuit 130. Furthermore, the first circuit block 110 comprises a memory 111, processor 112, a logic circuit portion 113 and an analog circuit portion 114. Similarly, the second circuit block 120 comprises a memory 121, processor 122, a logic circuit portion 123 and a analog circuit portion 124.

In the semiconductor circuit chip 101, the firs circuit block 110, the second circuit block 120 and the I/O circuit 130 belong to different power supply systems, respectively and provided via separated individual power supply routs. Each of the circuit blocks 110, 120, 130 is provided powers supply potentials controlled individually. Each power supply potential may be the same or different. Typically, the I/O circuit 130 operates with a higher voltage than other circuit blocks.

The semiconductor circuit apparatus 100 have a standby mode, which is a power save mode, and an active mode as operation modes. The standby mode and active mode are switched in accordance with predetermined conditions, as appropriate. The standby mode stops predetermined circuit operations, allowing a reduction in the power consumption. One of typical semiconductor circuit apparatus with the standby mode and active mode is used in mobile electronics such as a cellular phone and PDA (Personal Digital Assistance).

For example, if the semiconductor circuit apparatus 100 constitutes a part of a cellular phone, it operates in the active mode during transmitting and receiving. The semiconductor circuit apparatus 100 is placed into the standby mode during other states and stops unnecessary circuit operations to reduce the power consumption. On the other hand, receiving an incoming call during the standby mode, the semiconductor circuit apparatus 100 enters the active mode from the standby mode immediately in response to the incoming call. Apparently, the invention may be applied to various types of circuit apparatus as well as mobile electronics.

The semiconductor circuit apparatus 100 according the present embodiment provides power supply voltage at such a level that a memory is capable of keeping stored data, allowing high speed switching from the standby mode to the active mode. Specifically, when the semiconductor circuit apparatus 100 goes into the standby mode from the active mode, the power supply voltages to the first circuit block 110 and the second circuit block 120 are lowered in the semiconductor circuit chip 101 in the standby mode. The power supply voltage to the I/O circuit 130 can be designed as appropriate. For example, the I/O circuit 130 may be driven constantly regardless of operations modes. Alternatively, the power supply may be stopped to reduce the power consumption.

The higher power supply potentials provided to the first circuit block 110 and the second circuit block 120 are kept at such a level that the memories 111 and 112 can hold data. The higher power supply potentials are preferably reduced to the lowest levels which enable the memories 111 and 112 to keep stored data, in terms of power consumption reduction. Preferably SRAMs are used for the memories 111 and 121 in terms of high operation speed and low power consumption. During the standby mode, circuit blocks other than the memories 111 and 112 are stopped in the first circuit block 110 and the second circuit block 120. Specifically the processors 112 and 122, the logic circuit portions 113 and 123, and the analog circuit portions 114 and 124 are operationally stopped, respectively.

Figure 2:
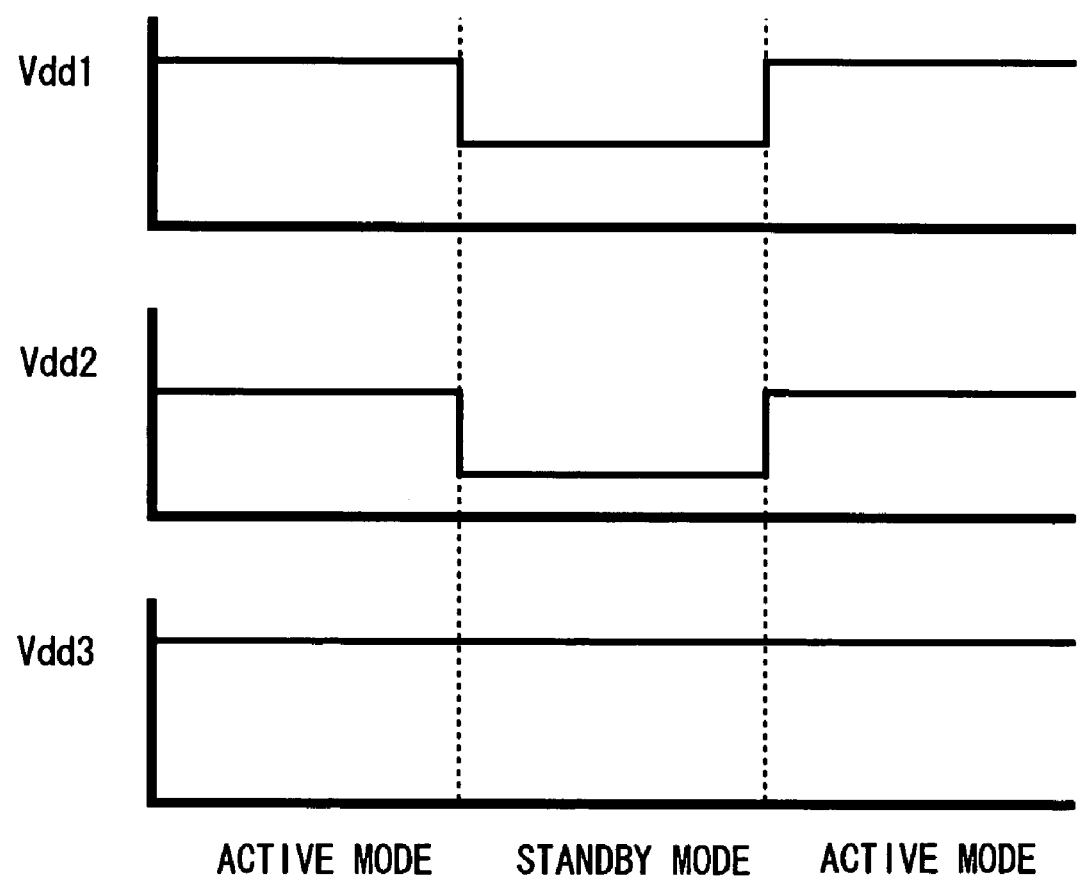
FIG. 2 is a timing chart showing powers supply potential change of a semiconductor circuit apparatus according to Embodiment 1.

FIG. 2 depicts a timing chart showing power supply potentials change in the active mode and the standby mode. Referring to FIG. 2, a switching operation of the operations modes will be described. In this example, the I/O circuit 130 operates constantly in both the active mode and the standby mode. Besides, the power supply potential Vdd1 to the first circuit block 110 is higher than the power supply potential Vdd2 to the second circuit block 120 in FIG. 2, as an example. Vdd2<Vdd1<Vdd3 is established.

During the active mode, the voltage regulator 102 provides the first circuit block 110, the second circuit block 120 and the I/O circuit 130 with power supply potentials Vdd1, Vdd2 and Vdd3, respectively. If the predetermined conditions are satisfied to switch to the standby mode, the control processor 103 presents control signals to the semiconductor circuit chip 101 and the voltage regulator 102 to switch to the standby mode.

The control processor 103 has preset data to define each power potential in the standby mode and the active mode. The control signals to the voltage regulator 102 include reference levels to identify the power potentials. The voltage regulator 102 generates and provides each power supply potential in accordance with the reference levels set by the control processor 103. The voltage regulator 102 reduces the power supply potential Vdd1 and Vdd2 for the standby mode. The power supply potential Vdd3 to the I/O circuit 130 is maintained at the same level. Vdd1<Vdd1 is established during the standby mode.

If predetermined conditions for transition to the active mode are satisfied, such as a cellular phone that receives an incoming call, the control processor 103 put out control signals to the semiconductor circuit chip 101 and the voltage regulator 102 to change to the active mode from the standby mode. The voltage regulator 102 raises the power supply potentials Vdd1 and Vdd2 for the first circuit block 110 and the second circuit block 120 to potentials for regular operations in accordance with the reference levels set by the control processor 103.

As depicted in FIG. 2, the power supply potentials Vdd1 and Vdd2 for the first circuit block 110 and the second circuit block 120 never become zero (supply stop) and constant potentials are supplied (1.2 V in the active mode and 0.6 V in the standby mode, for example). These power supply potentials ensure that data in the memories 111 and 121 are kept. Node potentials of each circuit portion are thus defined as HIGH or LOW, dispensing with an interface circuit to determine input/output data between circuit blocks for switching between the active mode and the standby mode. Thus, a reduction in circuit scale is achieved.

Further, node potentials in each circuit block are defined as HIGH or LOW. Therefore, a sequence is not needed for determining node potentials required in a conventional circuit that stops power supply, affording a high speed transition from the standby mode to the active mode. Specifically, the operation mode control according to the embodiment reduces the mode switching time from conventional several tens of micro-seconds to several tens of nano-seconds.

Figure 3:
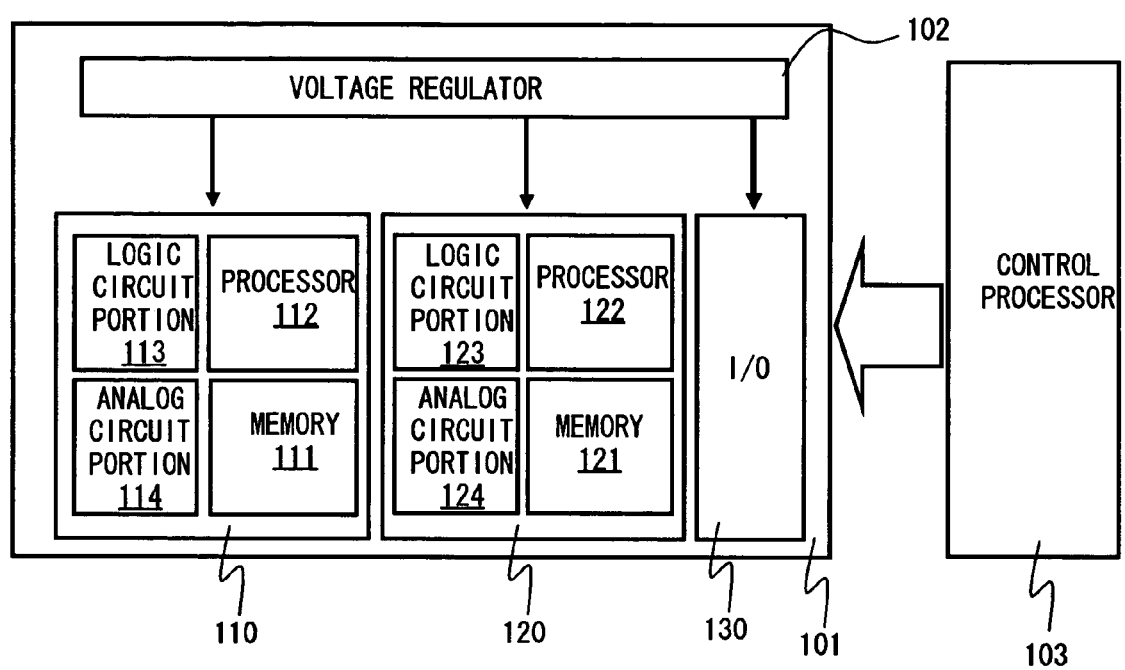
FIG. 3 is a schematic block diagram of another semiconductor circuit apparatus according to Embodiment 1.

While the voltage regulator 102 is formed outside the semiconductor circuit chip 101 (in a different chip) in the above example, the voltage regulator 102, as shown in FIG. 3, may be formed within the semiconductor circuit chip 101. In switching between the standby mode and the active mode, the voltage regulator 102 generates power supply potentials for circuit blocks according to the reference the control processor 103 to change supply potentials.

Embodiment 2

In mode switching, it is important to reduce leakage current during the standby mode to reduce the power consumption, as well as high speed switching. Sub-threshold leakage current and gate leakage current are known as the leak current. A MOS transistor with low threshold voltage can not turns off completely, leading to a large amount of sub-threshold leakage current. In a MOS transistor with a thin gate oxide film, tunnel leakage current flows through the thin gate oxide film. The tunnel leakage current flows from a gate to source/drain of from the source/drain to the gate.

Proper design for gate oxide film thickness is important to allow high speed operation and reduce leakage current. A thinner gate oxide film improves the operation performance, but it increases leakage current. On the other hand, thicker gate oxide film reduces leakage current, but it lowers the operation performance. Therefore, relatively thin gate oxide films are used in a circuit block which is required to operate at relatively high speed, and relatively thick gate oxide films are used in a circuit block which is not required to operate at high speed as another circuit. Design of proper different thicknesses of gate oxide films for different circuit blocks can keep the operation performance and reduce leakage current.

In the semiconductor circuit apparatus 100 illustrated in FIG. 1, transistors in each circuit block 110, 120 and 130 have different thickness of gate oxide films. Specifically, the relation between the thicknesses of the circuit block 110, 120 and 130 is as follows: I/O circuit 130>first circuit block 110>second circuit block 120.

When this thickness relation is established, the relation between the leakage currents of the circuit block 110, 120 and 130 is as follows: I/O circuit 130<first circuit block 110<second circuit block 120. The power supply potential of each circuit block is the same as described referring to FIG. 2, and the relation between them is described by: Vdd2<Vdd1<Vdd3. The second circuit block 120 which has thinner gate oxide films is provided with power supply potential lower than other circuit blocks during both active mode and standby mode. The semiconductor circuit apparatus 100 lowers the power supply potential Vdd1 and Vdd2 to the predetermined levels, specifically, to the lowest levels at which the memories can hold data in the standby mode. As the power supply potential is decreased, the leakage current decreases exponentially. Sub-threshold leakage current decreases approximately in proportion to the power supply potential.

Therefore, the first circuit block 110 may, for example, have thinner gate oxide films to increase the ON-current of transistors to improve the operation performance in the active mode. It is possible to design a proper relation between an improvement (preservation) of the operation performance and a reduction in the power consumption by reduced leakage current with the standby mode and the gate oxide film thickness design according to desired circuit block characteristics.

Figure 4:
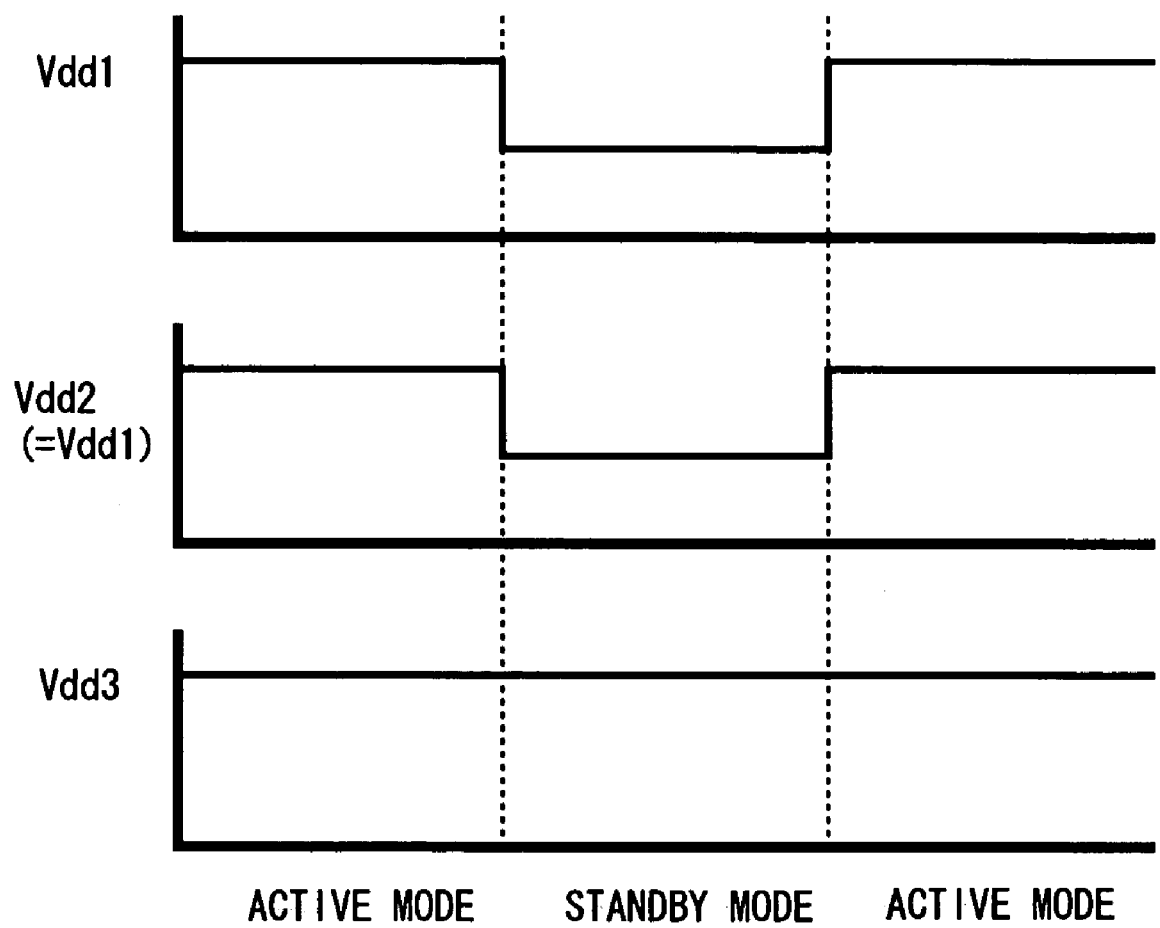
FIG. 4 is a timing chart showing powers supply potential change of a semiconductor circuit apparatus according to Embodiment 2.

In the above example, the first circuit block 110 and the second circuit block 120 belong to different power systems and they are provided with the power via different power supply routs. Alternatively, these two circuit blocks 110, 120 may have a common power supply rout for common power supply control of the first circuit block 110 and the second circuit block 120. In this case, the power supply potential Vdd1 and Vdd2 are the same value, as a timing chart in FIG. 4 depicts. Other points are the same as Embodiment 1. This configuration simplifies power supply structure of a circuit and power supply control for each circuit block.

Embodiment 3

Figure 5:
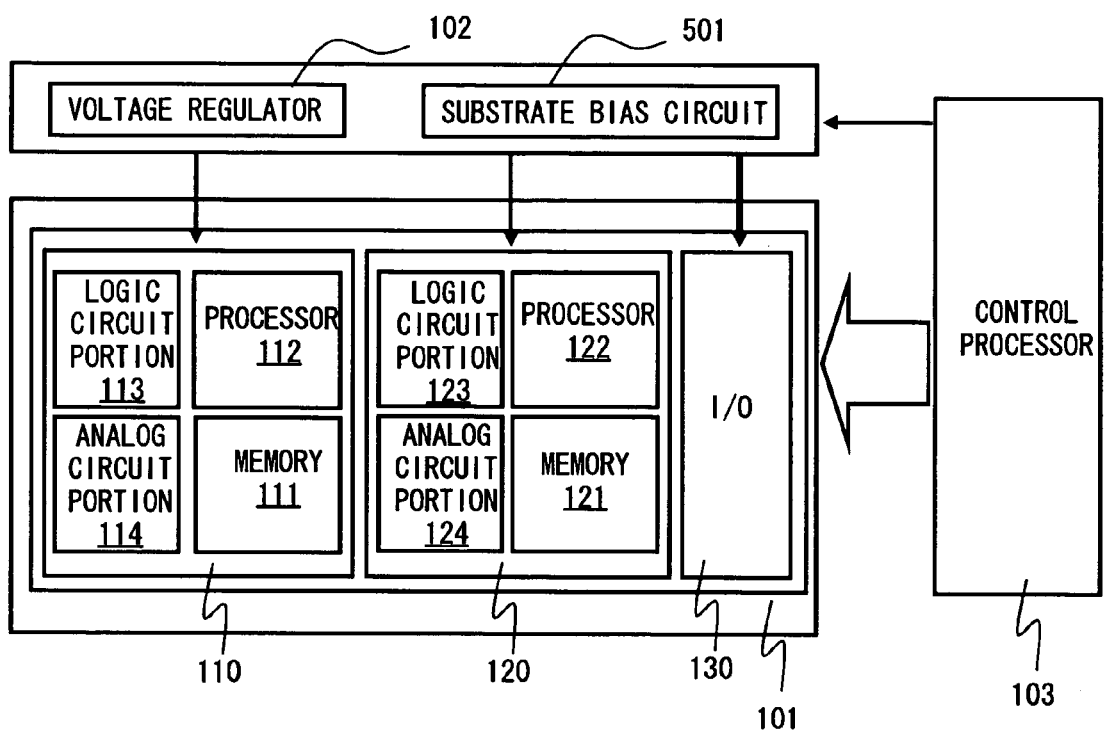
FIG. 5 is a schematic block diagram of a semiconductor circuit apparatus according to Embodiment 3.

It is preferable to control a substrate potential to decrease leakage current during the standby mode. FIG. 5 is a schematic diagram illustrating a semiconductor circuit apparatus according to the present embodiment. A substrate bias circuit 501 provides a substrate bias potential. The substrate bias circuit 501 is formed outside the semiconductor circuit chip 101, and it is formed on the same chip as the voltage regulator 102 in FIG. 5. Other configuration is substantially the same as FIG. 1 and details are omitted.

In a P type substrate, for example, the substrate potential during operation is generally set to ground. Reduction of the substrate potential (deviation in a negative direction) results in an increase in the threshold voltages of transistors. On the other hand, increase of the substrate potential (deviation in a positive direction) results in a decrease in the threshold voltages of transistors. An increase in the threshold voltage of a transistor results in a decrease in the sub-threshold leakage current. On the other hand, reduction of the power supply voltage along with the decrease of the threshold voltage of a transistor allows a decrease in the gate leakage current.

Therefore, the threshold voltage is preferably controlled to minimize the total leakage current of the sub-threshold leakage current and the gate leakage current. The substrate potential for the standby mode is reduced in the minus direction in a semiconductor circuit apparatus in which the sub-threshold leakage current is dominant. The leakage current during the standby mode is thus effectively reduced. On the contrary, the substrate potential for the standby mode is increased in the plus direction in a semiconductor circuit apparatus in which the gate leakage current is dominant. It allows a reduction in the leakage current during the standby mode.

In the active mode, the substrate potential is set to a proper value, not affecting adversely the operation performance of the circuit blocks 110 and 120. Combination of the low voltage operation of the standby mode and the substrate potential control reduces effectively the power consumption (including leakage current) without performance degradation of a circuit block.

Figure 6:
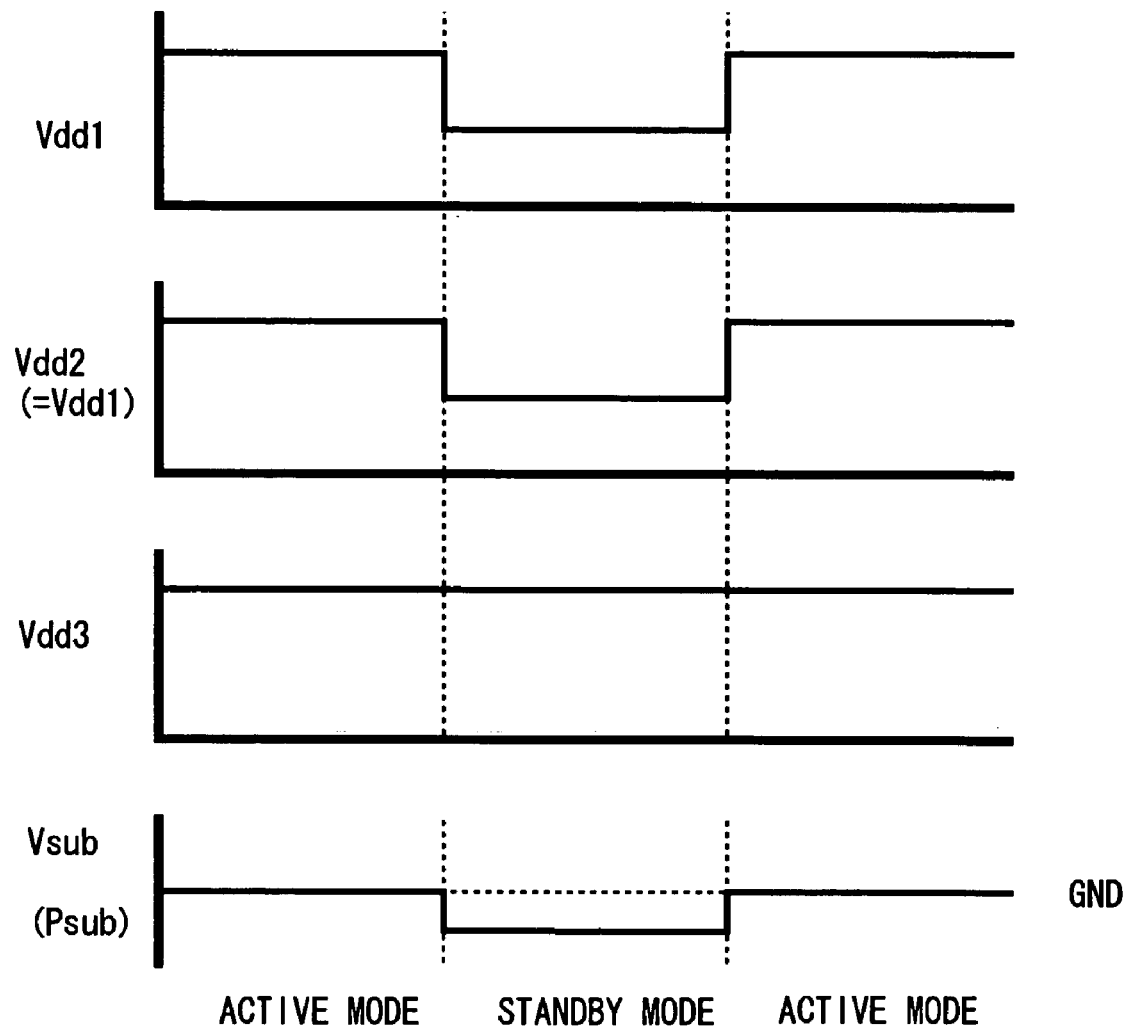
FIG. 6 is a timing chart showing power supply potential and substrate potential change of a semiconductor circuit apparatus according to Embodiment 3.

FIG. 6 is a timing chart depicting the varying power supply potentials in the active mode and the standby mode. Referring to FIG. 6, switching operation of the operation modes will be described. In the example shown in FIG. 6, the I/O circuit 130 operates constantly regardless of the operation modes, namely operates during both the active mode and the standby mode. Further, the first circuit block 110 and the second circuit block 120 receive power supply potentials through a common path and the power potential Vdd1 and Vdd2 are the same value. Also, Vdd2=Vdd1< Vdd3 is established.

In the active mode, the voltage regulator provides the first circuit block 110, the second circuit block 120 and the I/O circuit 130 with Vdd1, Vdd2 and Vdd3 respectively. Further, the substrate bias circuit 501 sets the substrate potential to ground. If the predetermined conditions are satisfied for going into the standby mode, the control processor 103 provides control signals to the voltage regulator 102 and the substrate bias circuit 501 to enter the standby mode.

The control processor 103 has obtained data for identifying the power supply potential and substrate potential in advance, and the control signals to the voltage regulator 102 and the substrate bias circuit 501 include reference levels that identify each potential. The voltage regulator 102 produces the power supply potentials in accordance with the reference levels set by the control processor 103 and supply them.

Further, the substrate bias circuit 501 produces and provides the substrate potential in accordance with the reference level set by the control processor 103. The voltage regulator 102 reduces the power supply potential Vdd1 and Vdd2 for the standby mode. The power supply potential to the I/O circuit 130 Vdd3 is kept at the same level. The power supply potentials Vdd1 and Vdd2 are preferably set to the lowest potential respectively which enables a memory to keep the stored data, as described in Embodiment 1. The substrate bias circuit 501 reduces the substrate potential for the standby mode. Thus, the substrate potential is reduced or increased for the standby mode.

If the predetermined conditions are satisfied to go into the standby mode, the control processor 103 signals the semiconductor circuit chip 101, the voltage regulator 102 and the substrate bias circuit 501 to enter the standby mode. The voltage regulator 102 raises the power supply potentials Vdd1 and Vdd2 for the first and second circuit blocks 110 and 120 to the potentials for the regular operations in accordance with the reference levels set by the control processor 103. The substrate bias circuit 501 also returns the substrate potential to ground in accordance with the reference level set by the control processor 103.

Figure 7A:
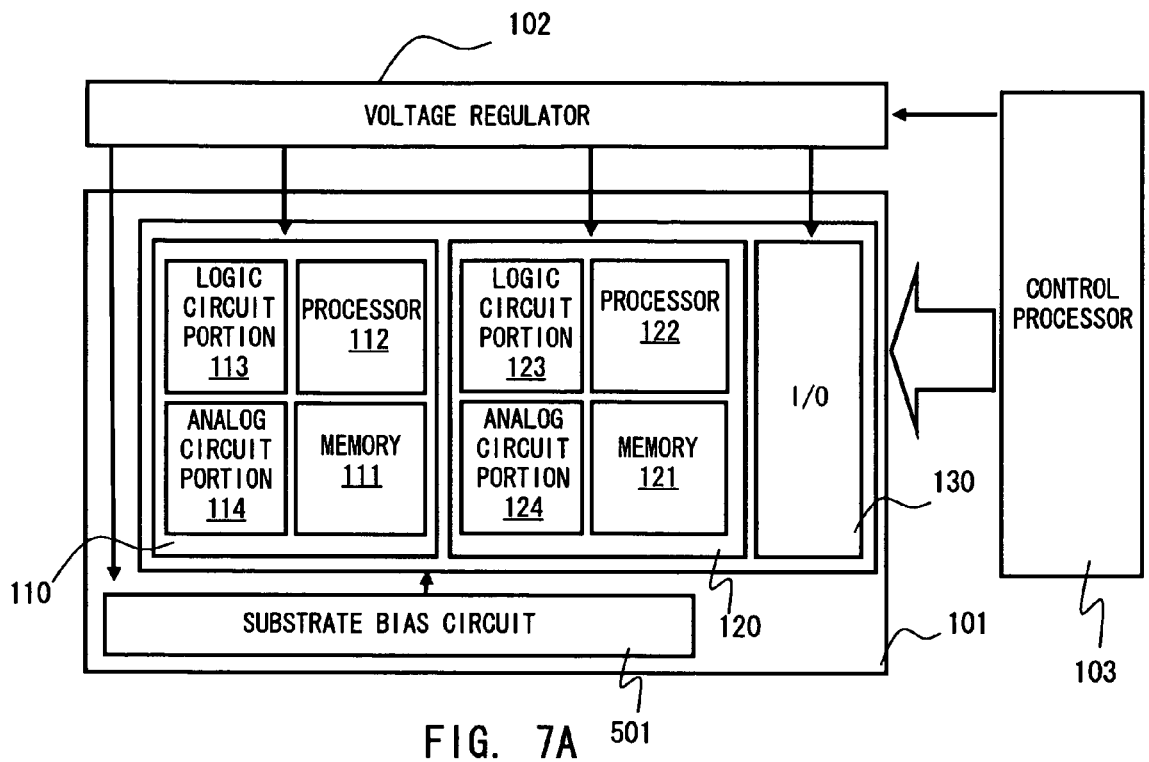
FIGS. 7A, 7B are schematic block diagrams of other semiconductor circuit apparatuses according to Embodiment 3.
Figure 7B:
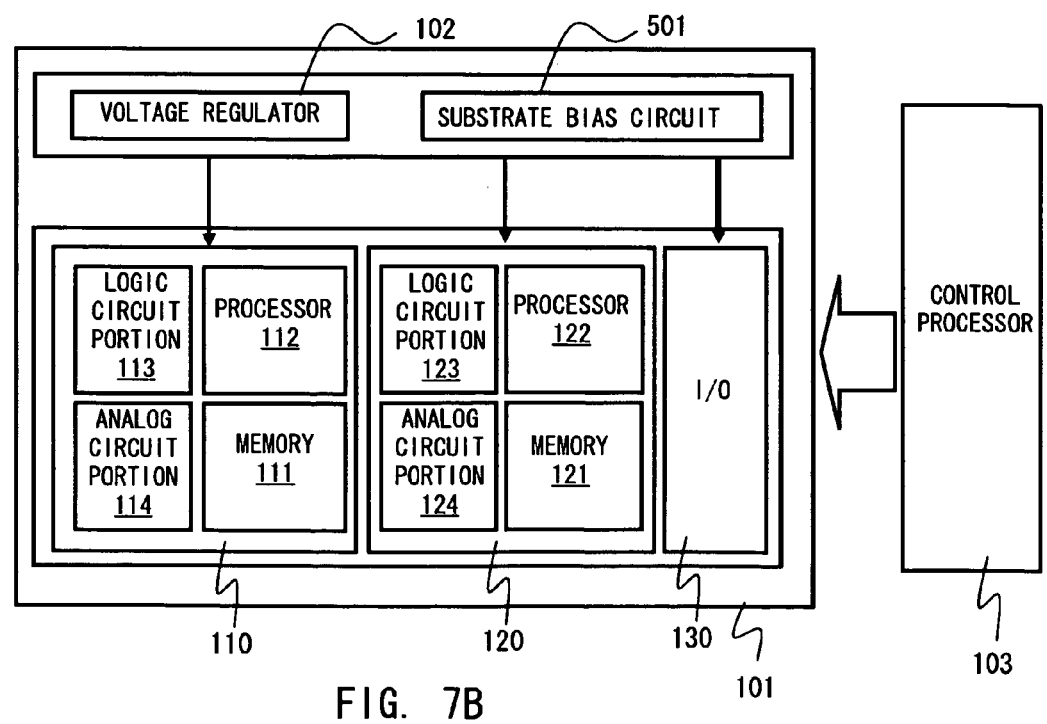

While the substrate bias circuit 501 is formed outside the semiconductor circuit chip 101 in the above mentioned example, it may be formed inside the semiconductor circuit chip 101 as illustrated in FIG. 7A, or both the voltage regulator 102 and the substrate bias circuit 501 may be formed inside the semiconductor circuit chip 101 as shown in FIG. 7B.

Embodiment 4

While, in the above embodiments, the control processor 103 provides the stored preset reference levels to the voltage regulator 102 and the substrate bias circuit 501 to control the power supply potential and the substrate potential, the present embodiment determines the potential level to keep data in a memory and controls the power supply potential in accordance with it.

Figure 8:
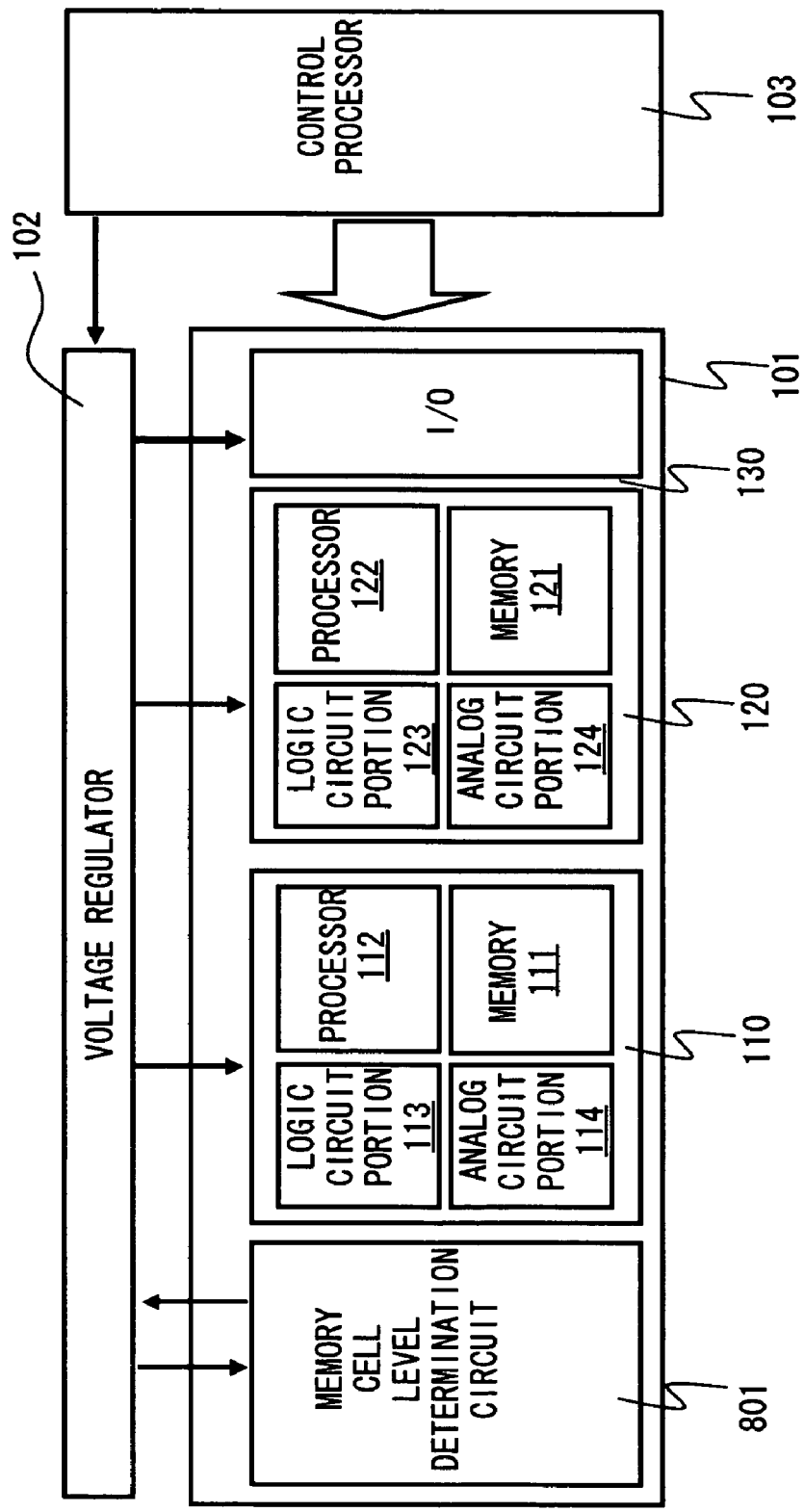
FIG. 8 is a schematic block diagram of a semiconductor circuit apparatus according to Embodiment 4.

FIG. 8 is a simplified schematic block diagram of a semiconductor circuit apparatus 800 according to the present embodiment. A memory cell level determination circuit 801 is formed in the semiconductor circuit chip 101 to determine the power supply potential levels required so as for each of the memories 111 and 112 in the semiconductor circuit chip 101 to keep stored data. The voltage regulator 102 supplies the power supply potential in the standby mode based on the determination of the memory cell level determination circuit 801. Since other configuration is substantially the same as Embodiment 1, the details are omitted.

Figure 9:
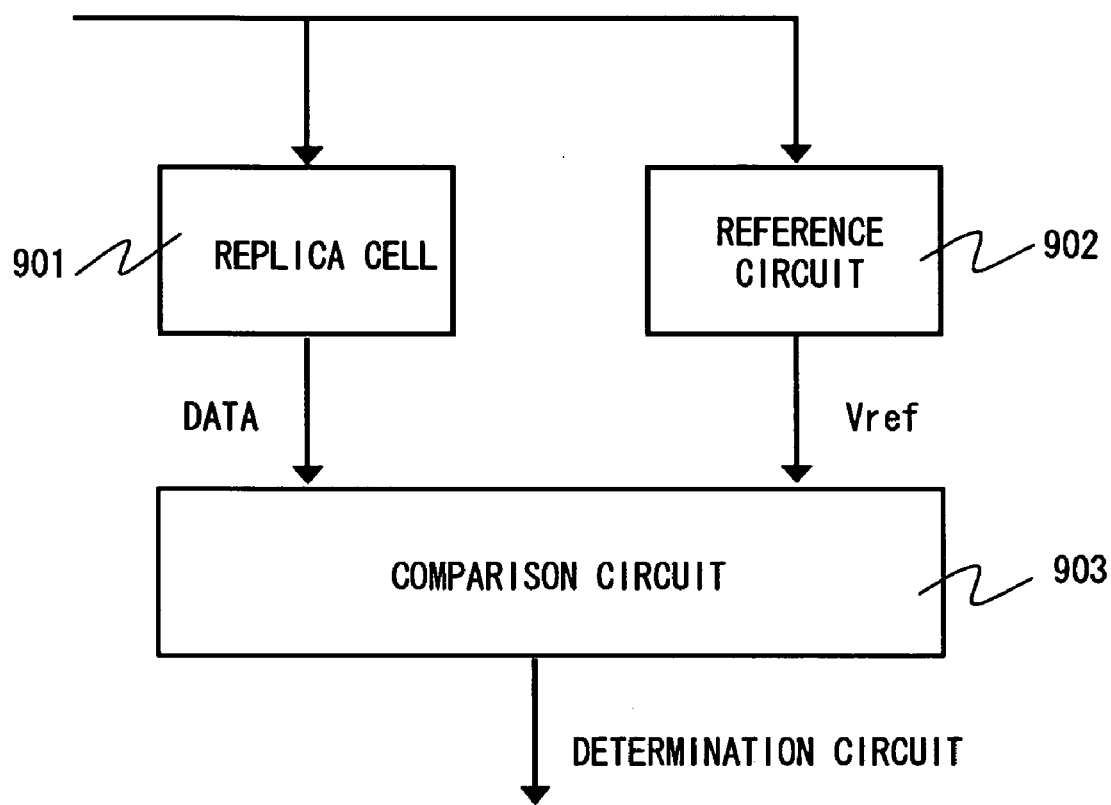
FIG. 9 is a schematic block diagram of a memory cell level determination circuit according to Embodiment 4.
Figure 10:
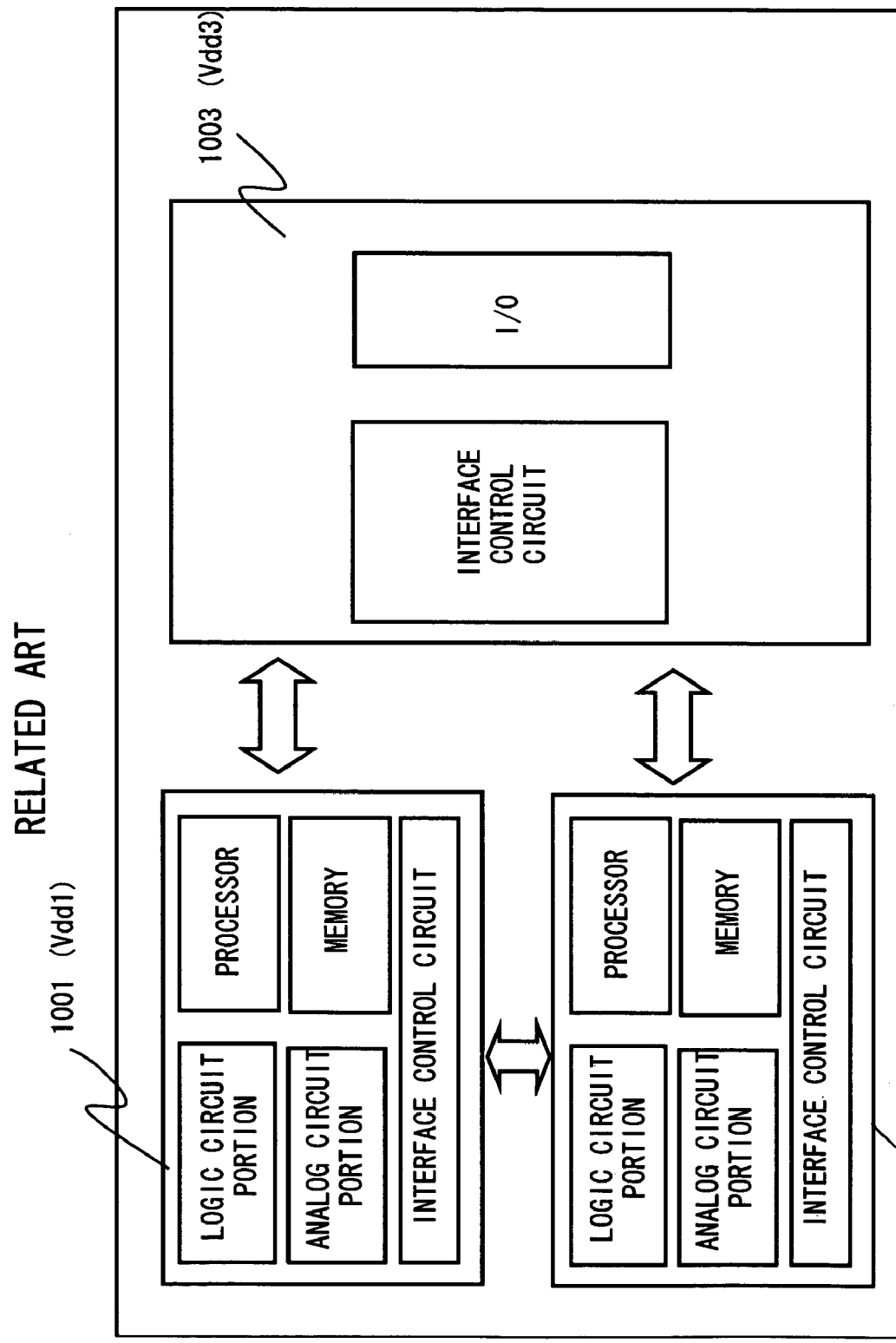
FIG. 10 is a schematic block diagram of a semiconductor circuit apparatus according to a related art.
Figure 11:
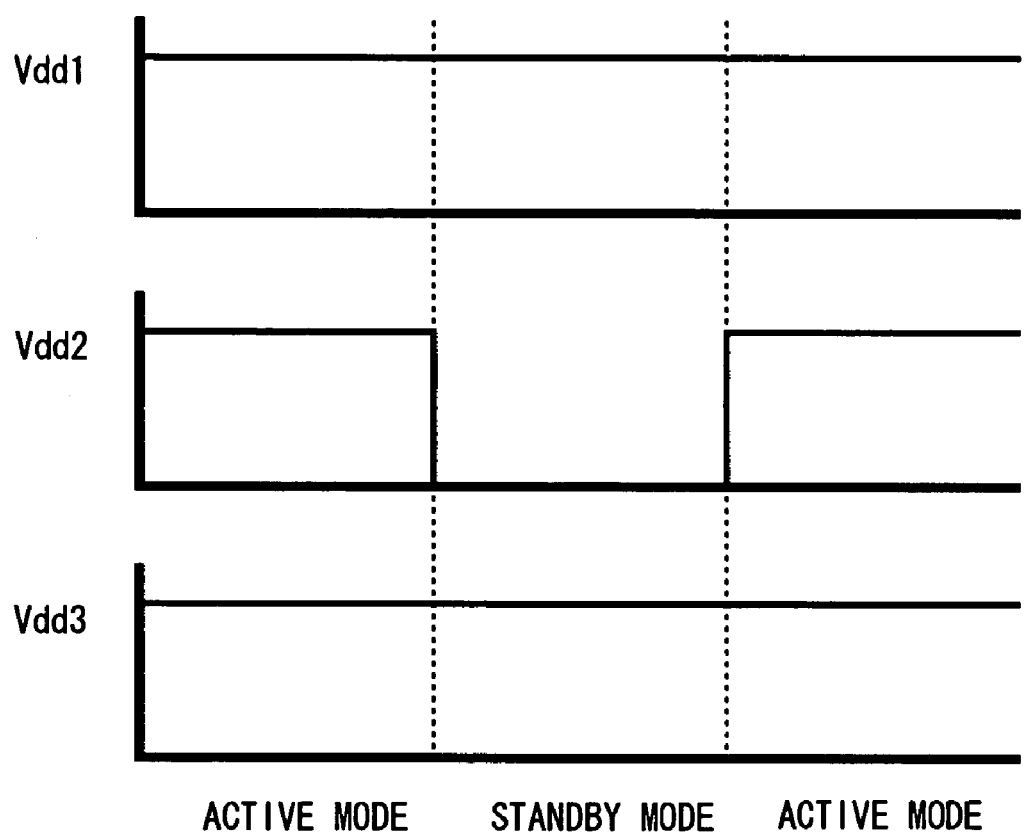
FIG. 11 is a timing chart showing powers supply potential change of a semiconductor circuit apparatus to a related art.

FIG. 9 is a detailed block diagram of a portion of the memory cell level determination circuit 801. FIG. 9 shows the configuration in the memory cell level determination circuit 801 to determine the potential level for the memory 111 contained in the first circuit block 110. The memory cell level determination circuit 801 comprises a replica cell 901, a reference circuit 902 and a comparison circuit 903.

The replica cell 901 has the same circuit configuration as a cell in the memory 111. If the memory 111 is SRAM, the cell includes flip-flops. Further, the replica cell 901 preferably has slightly worse characteristics than the cell in the memory 111. Thus, it ensures that the power supply potential level required for keeping data stored in a cell in the memory 111 is determined reliably.

The reference circuit 902 puts out the reference level (potential level) which is compared to the output of the replica cell 901. The reference level is smaller than HIGH output of the replica cell with the normal power supply potential. Specific values may be preset with proper design. The replica cell 901 is supplied with the same power supply potential as the memory 110 and changes its output according to the power supply potential. Comparing the output of the replica cell 901 with the reference level from the reference circuit 902, HIGH/LOW of the output of replica cell 901 is determined, namely it is determined whether the power supply potential is at the level capable of kept stored data.

The comparison circuit 903 compares the replica cell output with the reference level from the reference circuit 902 to put out a determination signal. If HIGH output of the replica cell 901 is greater than the reference level from the reference circuit 902, then the comparison circuit 903 can determine HIGH/LOW of the replica cell 901 output, so it determines that the power supply potential is large enough for the memory 110 to hold data and puts out the determination signal representing it.

If HIGH output of the replica cell 901 is smaller than the reference level, then the comparison circuit 903 cannot determine HIGH/LOW of the replica cell 901 output, so it determines that the power supply potential is not large enough for the memory 110 to hold data and puts out the determination signal representing it. The voltage regulator 102 controls the power supply potential in the standby mode according to the determination signal from the memory cell level determination circuit 801.

Switching operation from the active mode to the standby mode will be described. For entering the standby mode, the voltage regulator 102 reduces the output power supply potential based on the control signals from the control processor 103. The memory cell level determination circuit 801 carries out the determination process in response to the varying (decreasing) power supply potential level. The determination process compares the output of the replica cell 901 and the output of the reference circuit 902 at each power supply potential level.

If the output of the replica cell 901 is reduced smaller than the output of the reference circuit 902 and the determination signal changes to the signal indicating determination impossible, the voltage regulator 102 set the output potential to the power supply potential for the standby mode and keep the power supply potential at the output potential level during the standby mode. The memories 110 and 120 hold data at the power supply potentials determined by the memory cell level determination circuit. The voltage regulator 102 raises the power supply potential to the regular operation potential in accordance with the control signals from the control processor for going into the active mode from the standby mode.

The memory cell level determination circuit 801 comprises a circuit configured the same as FIG. 9 for determining the memory potential in the second circuit block 120, or if the memories 111 and 121 are controlled with a common power supply potential, the circuit configuration shown in FIG. 9 may be used to determine the standby mode potential of the two memories.

In the present embodiment, the memory cell level determination circuit 801 formed in the semiconductor determines the power supply potential of the standby mode, thus affording the optimal power supply potential for each circuit block or chip. The above configuration of the memory cell level determination circuit is a preferred example and the memory cell level determination circuit according to the invention is not limited to this configuration.

It is apparent that the present invention is not limited to the above embodiment and it may be modified and changed without departing from the scope and spirit of the invention.

What is claimed is:

1. A semiconductor circuit apparatus comprising:
   a circuit block including a memory;
   a power supply control circuit providing a reduced power supply voltage to the circuit block in a power save mode at which a part of the circuit block other than the memory is stopped and the memory is capable of keeping stored data,
   wherein a power supply determination circuit determines the reduced power supply voltage using a replica cell of the memory.

2. The semiconductor circuit apparatus of claim 1, wherein the power supply control circuit provides a power supply voltage greater than the power save mode to the circuit block in an active mode, at which the part of the circuit block and the memory performs regular operations.

3. The semiconductor circuit apparatus of claim 2, wherein a substrate potential during the power save mode is different from a substrate potential during the active mode.

4. The semiconductor circuit apparatus of claim 3 wherein the circuit block is formed on a P type substrate, and the substrate potential during the power save mode is lower than the substrate potential during the active mode.

5. The semiconductor circuit apparatus of claim 1, further comprising a second circuit block including a second memory, wherein the power supply control circuit providing a reduced power supply voltage to the second circuit block in a power save mode at which a part of the second circuit block is stopped and the second memory is capable of keeping stored data.

6. The semiconductor circuit apparatus of claim 5, wherein the power supply control circuit provides a power supply voltage to the second circuit block in an active mode greater than the power save mode, at which the part of the second circuit block and the second memory performs regular operations.

7. The semiconductor circuit apparatus of claim 5, wherein the circuit block and the second circuit block are provided a power supply voltage through a common power supply route.

8. The semiconductor circuit apparatus of claim 5, wherein a gate insulating film thickness of a transistor in the circuit block is smaller than a gate insulating film thickness of a transistor in the second circuit block.

9. The semiconductor circuit apparatus of claim 8, wherein the reduced power supply voltage to the second circuit block is smaller than the reduced power supply potential to the circuit block.

10. The semiconductor circuit apparatus of claim 1, wherein the power supply control circuit provides the circuit block with a preset level of power supply voltage as the reduced power supply voltage.

11. The semiconductor circuit apparatus of claim 1, further comprising a power supply voltage determination circuit, wherein the power supply control circuit provides the circuit block with the reduced power supply voltage determined by the power supply voltage determination circuit.

12. The semiconductor circuit apparatus of claim 11, wherein the power supply voltage determination circuit and the circuit block are formed in a single chip.

13. A semiconductor circuit apparatus comprising:
    a substrate;
    a circuit block including a memory formed on the substrate; wherein
    the circuit block performs regular operations at a first power supply voltage in an active mode, and a part of the circuit block other than the memory is stopped and the memory keeps stored data at a second power supply voltage smaller than the first power supply voltage in a power save mode,
    wherein a power supply determination circuit determines the reduced power supply voltage using a replica cell of the memory.

14. A semiconductor circuit apparatus of claim 13, wherein a substrate potential of the substrate in the power save mode is set to a different level from the active mode.

15. A semiconductor circuit apparatus, comprising:
    at least one circuit block comprising at least one volatile memory;
    a voltage regulator capable of supplying a plurality of voltages to the at least one circuit block; and
    a control circuit capable of causing the voltage regulator to supply at least a first power supply voltage level and a second power supply voltage level to the at least one circuit block, wherein the at least one circuit block performs functional operations in an active mode at the first power supply voltage level and, other than the at least one volatile memory, ceases to perform functional operations in a standby mode at the second power supply voltage level, and wherein the second power supply voltage level in the standby mode provides power to the at least one volatile memory sufficient to prevent loss of data stored in the at least one volatile memory, stored data, wherein a power supply determination circuit determines the second power supply voltage using a replica cell of the memory.

16. The semiconductor circuit apparatus of claim 15, further comprising a substrate bias circuit capable of changing a substrate bias potential of the at least one circuit block when the operation of the at least one circuit block changes between the active mode and the standby mode.

* * * * *